United States Patent [19]

Lee et al.

[11] Patent Number: 4,727,122

[45] Date of Patent: Feb. 23, 1988

[54] RECOVERY OF UNREACTED MONOMERS IN OLEFIN POLYMERIZATION PROCESS

[75] Inventors: Carol S. Lee, Princeton, N.J.; John L. Pickering, Jr., Kingwood, Tex.

[73] Assignee: Mobil Oil Corporation, New York, N.Y.

[21] Appl. No.: 903,541

[22] Filed: Sep. 4, 1986

[51] Int. Cl.[4] ............................................. C08F 6/10
[52] U.S. Cl. ........................................ 526/68; 585/825; 585/829; 55/74; 55/387; 55/389
[58] Field of Search ........................... 526/68; 528/501; 55/387, 389, 74; 585/825, 829

[56] References Cited

U.S. PATENT DOCUMENTS

| | | | |
|---|---|---|---|
| 2,963,519 | 12/1960 | Kasperik et al. | 585/829 |
| 3,255,171 | 7/1966 | Eilbracht et al. | 526/68 |
| 3,360,582 | 12/1967 | Mattox | 585/289 |
| 3,373,103 | 3/1968 | Cooper et al. | 585/826 |
| 3,488,339 | 1/1970 | Carter | 260/93.7 |
| 4,235,983 | 11/1980 | Steigelmann et al. | 526/68 |
| 4,340,701 | 7/1982 | Willmore et al. | 526/68 |
| 4,372,758 | 2/1983 | Bobst et al. | 55/48 |

FOREIGN PATENT DOCUMENTS 0100550 8/1983 European Pat. Off.
848190 9/1960 United Kingdom ........... 585/825

OTHER PUBLICATIONS

U.S. Ser. No. 862,163, filed 5/9/86, to Hagerty.

Primary Examiner—Joseph L. Schofer
Assistant Examiner—Angela L. Fugo
Attorney, Agent, or Firm—Alexander J. McKillop; Michael J. Gilman; Stanislaus Aksman

[57] ABSTRACT

There is disclosed a process for recovering olefin monomers, e.g., $C_3$–$C_{10}$ alpha-olefins, from a vent gas of a vapor phase process for polymerizing olefins. The method comprises passing the vent gas, obtained by purging a resin produced in the polymerization process with an inert gas, such as nitrogen, into contact with an adsorbent to effect the adsorption of an olefin monomer. Subsequently, the adsorbed monomer is removed by contacting the adsorbent with a second monomer having lower molecular weight than the adsorbed monomer.

16 Claims, 3 Drawing Figures

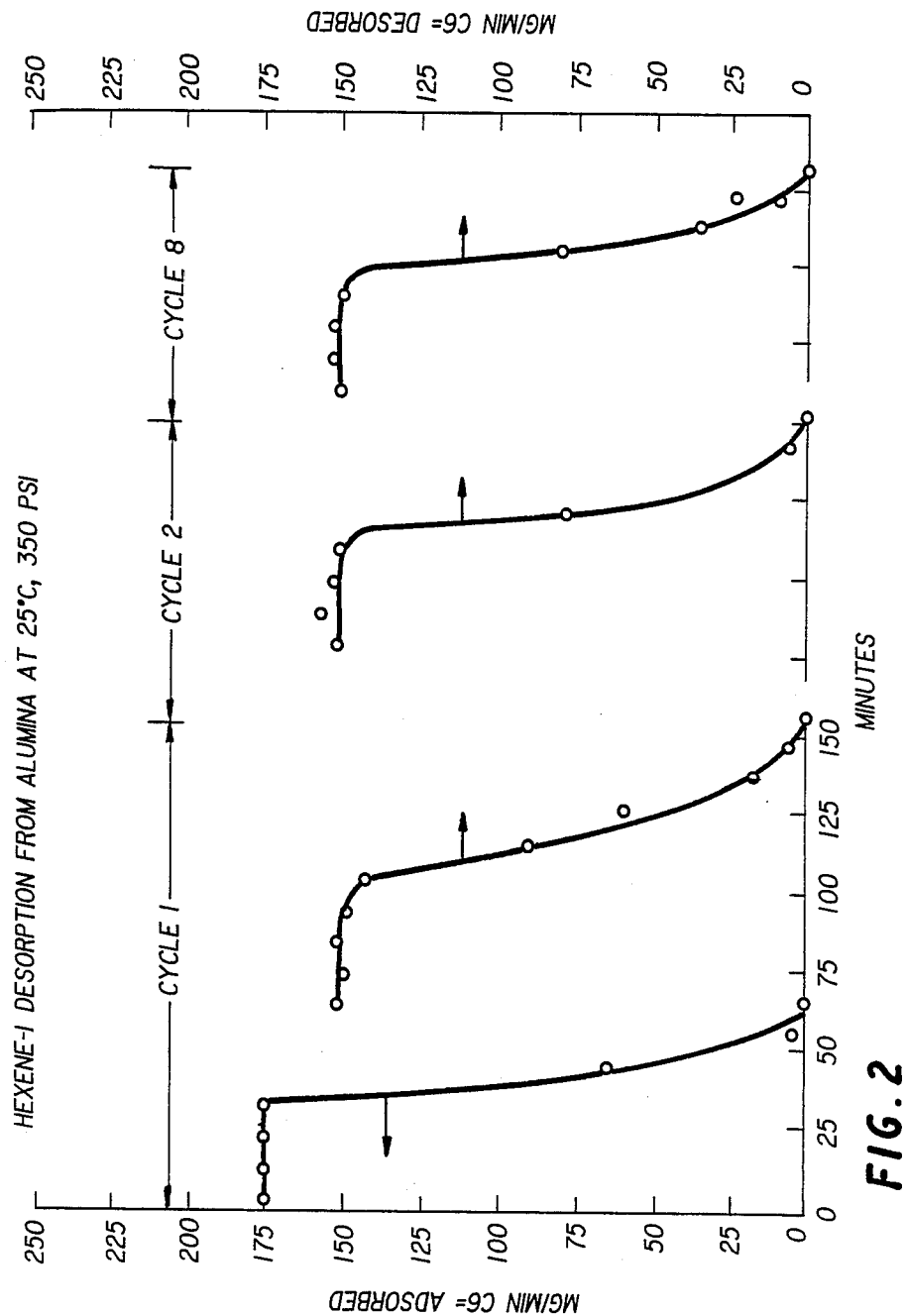

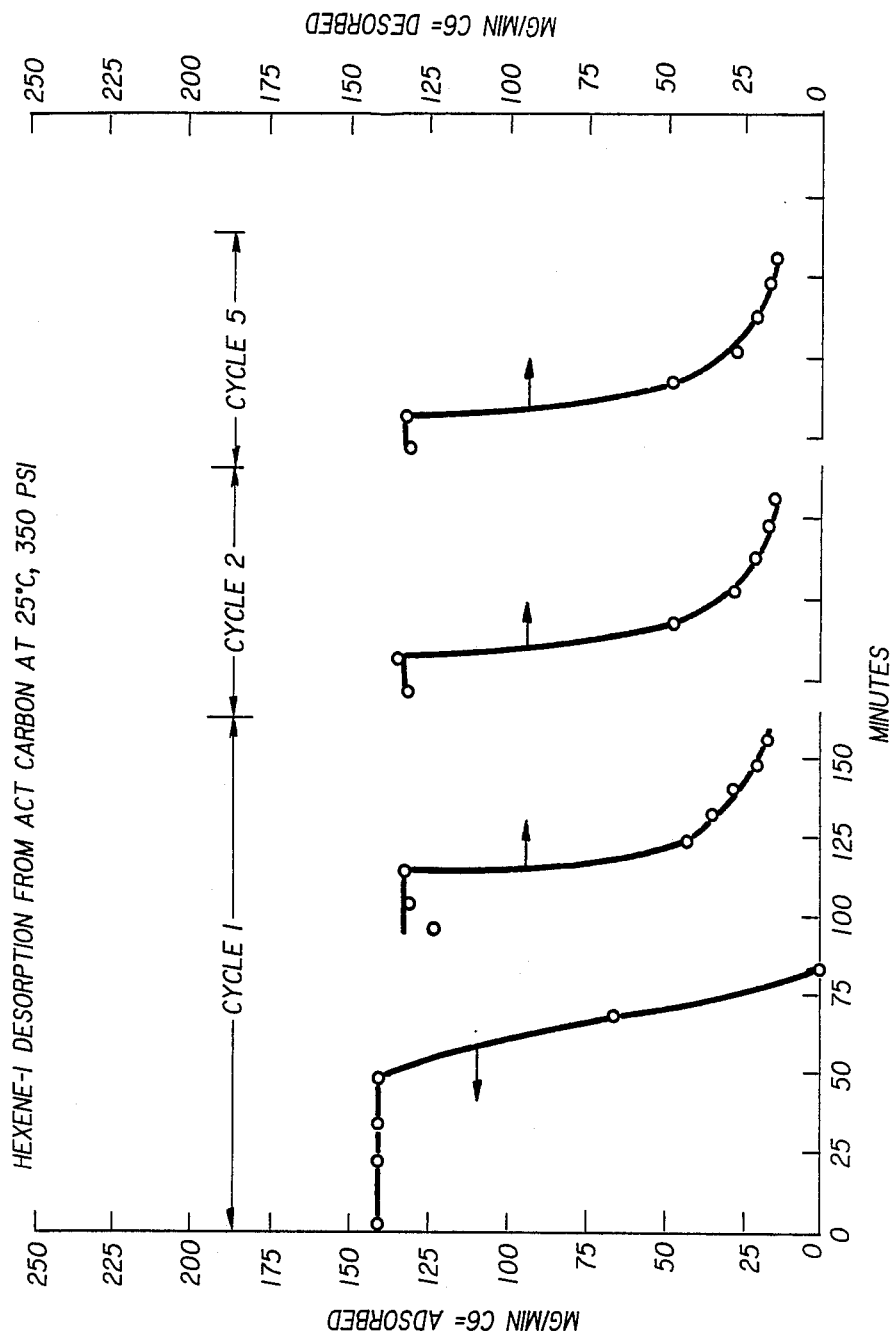

RECOVERY OF UNREACTED MONOMERS IN OLEFIN POLYMERIZATION PROCESS

BACKGROUND OF THE INVENTION

1. Field of the Invention

This invention relates to a method of recovering unreacted monomers from an effluent stream of an olefin polymerization process. More particularly, the invention relates to a cyclic method of recovering unreacted monomers by the adsorption and subsequent desorption thereof and the recycle of the monomers to the reactor.

2. Description of the Prior Art

Polymers and copolymers of $C_2$–$C_{10}$ olefins, particularly copolymers of ethylene and higher alpha-olefins, have in recent years been produced in gas phase, fluid bed reactors. Karol et al, U.S. Pat. No. 4,302,566, describe a gas phase, fluid bed reactor for producing linear low density polyethylene polymers. Graff, U.S. Pat. No. 4,173,547, Stevens et al, U.S. Pat. No. 3,787,384, Strobel et al, U.S. Pat. No. 4,148,754 and Ziegler, deceased, et al, U.S. Pat. No. 4,063,009, describe various polymerization processes which produce polyethylene other than linear low density polyethylene.

Nowlin et al, U.S. Pat. No. 4,481,301, teach the preparation of a highly active alpha-olefin polymerization catalyst, and a polymerization process utilizing the catalyst, comprising contacting a support material, e.g., silica, containing reactive OH groups with a stoichiometric excess of an organomagnesium composition, and subsequently treating the product with a tetravalent titanium compound.

Bobst et al, U.S. Pat. No. 4,372,758, disclose a process for removing unpolymerized monomers from alpha-olefin polymers, comprising introducing an inert gas into a purge vessel countercurrently to the flow of the polymer product also introduced into the purge vessel. The unreacted hydrocarbon monomers are stripped from the product in the purge vessel, a vent gas containing the monomers is recovered from the purge vessel, a portion of the vent gas is burned in a flare, and the remainder thereof is recycled to the purge vessel as a conveying stream for the polymer or as a purge stream.

Yamaguchi et al, U.S. Pat. No. 3,989,881, disclose a solid catalytic complex for the polymerization of olefins comprising magnesium and a metal halide, wherein the metal is titanium or vanadium, and a cyclic or an aliphatic ether. The catalyst is used in the polymerization of alpha-olefins to produce polymers having relatively high bulk density.

The entire contents of all of the above-discussed patents are incorporated herein by reference.

As is known to those skilled in the art, in olefin, especially alpha-olefin, polymerization processes the product polymers, i.e., resins, contain some unreacted hydrocarbon monomers, e.g., see Bobst et al, discussed above. For economic, safety and environmental reasons, the unreacted hydrocarbon monomers are removed from the resins before they are stored in shipping containers. One of the heretofore-practiced methods of removing the monomers involved stripping thereof from the product in a purge vessel, thereby generating a vent gas containing the monomers. The vent gas was removed from the purge vessel and it was either burned in a flare or, at least a portion thereof, was recycled to the purge vessel as a conveying stream for the polymer or as a purge stream (see the aforementioned patent to Bobst et al).

However, a need still exists in the art for providing a more energy efficient and relatively low cost method of removing unreacted hydrocarbons, such as monomers, from the vent gas of an olefin polymerization process.

SUMMARY OF THE INVENTION

A method of recovering at least one olefin monomer from a vent gas of a vapor phase olefin polymerization process comprises passing the vent gas containing the olefin monomer (first monomer) into contact with an adsorbent from a sufficient time and at such conditions as to effect the adsorption of the first monomer onto the adsorbent. The adsorbed monomer is subsequently removed from the adsorbent by contacting the adsorbent with an olefin monomer having lower molecular weight (second monomer), than the first monomer, e.g., ethylene, thereby producing a stream of the second monomer containing the first monomer. The second monomer-containing stream is then introduced into the reactor of the olefin polymerization process.

BRIEF DESCRIPTION OF THE DRAWINGS

FIG. 2 is an illustration of adsorption and desorption cycles for the data of Example 1.

FIG. 3 is an illustration of adsorption and desorption cycles for the data of Example 2.

DETAILED DESCRIPTION OF THE INVENTION

Figure 1:
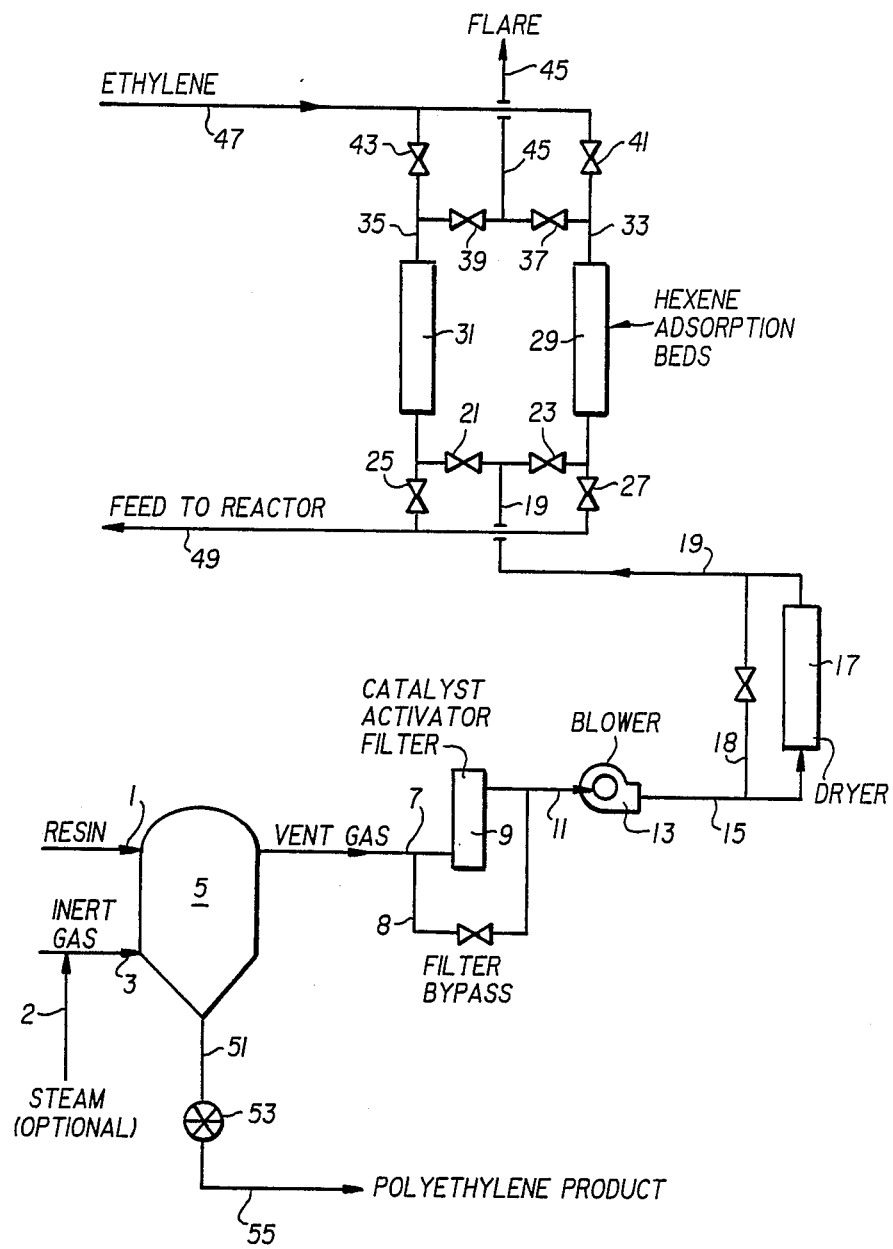
FIG. 1 is a schematic representation of an exemplary embodiment of the invention.

The olefin monomer or monomers, removed according to the method of the present invention, are usually higher monomers used in a vapor phase alpha-olefin polymerization process which produces the vent gas used as a feedstock in the method of the present invention. Such higher monomers are, for example, propylene, 1-butene, 1-hexene, 4-methyl-1-pentene, 1-octene, 1-decene or mixtures thereof.

The vent gas from which the unreacted monomers are removed in accordance with the present invention is obtained in any conventional manner known to those skilled in the art, e.g., according to the process of Bobst et al, U.S. Pat. No. 4,372,758. The adsorbent used in the process of the invention can be any suitable adsorbent, such as activated carbon, alumina, molecular sieves or silica. Preferably, the adsorbent is activated carbon for the adsorption of 1-butene and alumina for the adsorption of 1-hexene.

The adsorption/desorption cycles are conducted in separate beds of adsorbents. At least two (2) separate adsorbent beds are therefore necessary to alternate the adsorption/desorption cycles therein, as will be apparent to those skilled in the art.

The adsorption is conducted in any known conventional manner, e.g., by passing the vent gas containing the unreacted monomer or monomers through a bed of a suitable adsorbent. The conditions of the adsorption step of the process are any conditions suitable for preferentially adsorbing the unreacted monomer or monomers from the vent gas. However, in a commercially preferred embodiment, the adsorption step is conducted at the temperature of the vent gas, which is usually about 90° C., and at the pressure of the vent gas, i.e., usually atmospheric pressure. At such a relatively high temperature of the vent gas, alumina has a relatively low adsorption capacity for 1-butene. Therefore, if it is desired to use alumina as the adsorbent in the process to adsorb 1-butene, it is usually necessary to cool the vent gas to about 50° C. to increase the adsorption capacity of the adsorbent. If the vent gas temperature is not decreased, the size of the adsorption bed must be increased to compensate for the loss of the adsorption capacity of alumina at the increased temperature.

Alumina is the preferred adsorbent for 1-hexene because in the desorption step of the method substantially all of the 1-hexene is removed from alumina. In contrast, activated carbon is the preferred adsorbent for 1-butene because it has a high adsorption capacity for the 1-butene even at the relatively high temperature (about 90° C.) of the vent gas produced in the polymerization process. During the desorption cycle, activated carbon also retains very little, if any, 1-butene, thereby minimizing the possibility of the isomerization of the residual 1-butene to internal olefins. Conversely, if activated carbon is used to adsorb 1-hexane, after the desorption cycle is completed, small amounts of residual 1-hexane are left on the activated carbon, thereby presenting a possibility of the isomerization of the 1-hexene to internal olefin isomers thereof. As will be apparent to those skilled in the art, the presence of internal olefins, such as 2-hexene, is undesirable in the alpha-olefin gas phase polymerization reaction because the polymerization rate of the sterically-hindered internal olefins is so low, in comparison to the alpha-olefins, that internal olefins constitute substantially inert diluents. The adsorption cycle is preferably conducted until the adsorbent is saturated or nearly saturated with the monomer or monomers.

The desorption step of the method of the present invention is conducted by passing at least one monomer having lower molecular weight than the previously-adsorbed monomer through the adsorption bed. Thus, in the case of the copolymerization of ethylene with a $C_3$–$C_{10}$ alpha-olefin, and the adsorption of a $C_3$–$C_{10}$ alpha-olefin in the adsorption bed, ethylene or one of the lower monomers is used to desorb one of the higher monomers. In the preferred embodiment, the desorption gas is ethylene used in the olefin polymerization process to produce the polymer resins. The ethylene is preferably conducted into the adsorption bed in the direction countercurrent to that of the flow of the vent gas in the adsorption step of the method. The ethylene is preferably used to desorb the monomer at the temperature and pressure at which the ethylene is used as a feed in the polymerization reaction. Thus, the bed of adsorbent is preferably contacted with ethylene at a pressure of about 250 to about 400 psig, preferably about 300 to about 375 psig and most preferably at about 350 psig and at an ambient temperature, e.g., about 30° C. The flow rate of the monomer used to desorb the monomer or monomers adsorbed by the adsorbent is less than or equal to the flow rate of monomers to the polymerization reactor. It is a surprising aspect of the present invention that in the desorption cycle of the present method substantially all of the adsorbed monomers are removed from the adsorbent at the aforementioned relatively high pressure since, until now, it was thought that the desorption cycle of pressure swing adsorption processes had to be conducted at low pressure and high temperature relative to the adsorption cycle. It was also thought in prior art that the adsorption cycle of a typical pressure swing adsorption process had to be conducted at a relatively high pressure and low temperature in comparison to the desorption cycle, e.g., see Ruthven, *PRINCIPLES OF ADSORPTION AND ADSORPTION PROCESSES*, John Wiley and Sons, Inc., New York (1984). In contrast, it was discovered that the adsorption cycle of the invention is readily conducted at the relatively low pressure and high temperature of the purge vessel vent gas. It will be apparent to those skilled in the art that the operation of the desorption step of the method, in the preferred embodiment, at the pressure and temperature conditions of the feed normally introduced into the polymerization reactor is advantageous because it eliminates the necessity for providing equipment and methods of adjusting the temperature and pressure of the gaseous stream, containing the desorbed monomers, to the temperature and pressure of the polymerization reactor. Similarly, the operation of the adsorption step at the conditions of the purge vessel vent gas is cost effective and preferred to the operation thereof at different conditions since no additional equipment is necessary to alter the conditions of the purge vessel vent gas.

The invention will now be described in conjunction with one exemplary embodiment thereof illustrated in FIG. 1. However, it will be apparent to those skilled in the art that the following description relates only to one exemplary embodiment of the invention and is not intended to limit the scope thereof.

FIG. 1 schematically represents the method of the present invention in conjunction with a polymerization process for the preparation of linear low density polyethylene (LLDPE) from ethylene and 1-hexene monomers. Referring to FIG. 1, the resin prepared in the polymerization process (not shown) is conducted through a conduit 1 to a purge vessel 5. An inert purge gas, such as nitrogen, is introduced into the purge vessel through a conduit 3. The purge vessel and the method of operating thereof are similar to those of Bobst et al, U.S. Pat. No. 4,372,758. Accordingly, the details of the purge vessel or the operation thereof will not be discussed herein. The inert gas removes dissolved and entrained, unreacted monomers from the resin, thereby producing a vent gas, removed from the purge vessel by a conduit 7. The inert purge gas employed in the process of the invention, such as the gas introduced through a conduit 3 into the purge vessel 5 in the embodiment of FIG. 1, may be any gas which is inert to the resin being purged, the particular gaseous monomers being removed and the polymerization catalyst used to make the resin. The preferred purge gas is nitrogen, although other gases, such as helium, may also be employed. In the preferred embodiment, the nitrogen content of the purge gas is at least about 99.9 percent and oxygen is substantially excluded from the purge gas. The exclusion of oxygen eliminates the danger of explosion of a mixture of hydrocarbon(s) and oxygen.

In the embodiment illustrated in FIG. 1, the vent gas removed in conduit 7 from the purge vessel 5 is a diluted stream of 1-hexene in nitrogen at 80° C. and nearly atmospheric pressure. The stream contains about 20 mole percent of 1-hexene. Polyethylene product is removed from the purge vessel through a conduit 51, a rotary valve 53 and a conduit 55.

The vent gas is then optionally conducted to a catalyst activator filter 9 wherein an aluminum alkyl, such as triethylaluminum (TEAL), is removed from the vent gas. The activator filter contains silica, such as Davison 952 silica. It is operated at the temperature and pressure of the vent gas and, at those conditions, removes substantially all of the activator from the vent gas. Subsequently, the vent gas is conducted to a blower 13 which conducts it, through a conduit 15, into a dryer, a bypass line 18, and then to a conduit 19. In an alternative embodiment, steam can be introduced into the purge vessel 5 via a conduit 2 and the inert gas conduit 3 where it mixes with the purge gas before entering the purge vessel. In this embodiment, the vent gas from the purge vessel 5 flows through conduit 7, through the filter bypass 8, through conduit 11 into the blower 13, and then through conduit 15 into the dryer 17. The dryer is suitably a molecular sieve dryer, containing suitable molecular sieves for removiing moisture, e.g., Linde 3A molecular sieves, wherein substantially all of the excess moisture is removed from the vent gas. A residual moisture concentration of less than 1 ppm is acceptable and typical. The gas is then conducted to one of two 1-hexene adsorption beds 29 or 31. One of the two adsorption beds is in the desorption cycle, while the other in the adsorption cycle. Thus, for instance, if the adsorption bed 29 is in the adsorption cycle and bed 31 in the regeneration cycle, the gas is conducted through a conduit 19 and an opened valve 23 into the adsorption bed 29. In the hexene adsorption bed, containing, for example, alumina, the gas is adsorbed onto the alumina at the temperature of about 80° C. and the pressure of about 2 to 8 psig. The residence time of the gas in the adsorption bed 29 in terms of space velocity is from about 25 $hr^{-1}$ to about 75 $hr^{-1}$ (reciprocal hours). The effluent from the adsorption bed 29, removed therefrom through a conduit 33, is conducted through an opened valve 37 into the line 45 leading to the flare. During this cycle, the valves 21, 27 and 41 are closed.

To regenerate the alumina adsorbent, i.e., desorb, the previously-adsorbed 1-hexene from the alumina in bed 31, ethylene at about 30° C. and about 350 psig, is conducted through a conduit 47 and an opened valve 43 into the conduit 35 which carries the ethylene countercurrently to the direction of flow of 1-hexene in the adsorption cycle into the adsorption bed 31. In the bed 31, ethylene desorbs previously-adsorbed 1-hexene from the alumina and the thus-obtained 1-hexene-containing ethylene stream is conducted through an opened valve 25 into the conduit 49 which, in turn, carries the stream as a feed to the reactor, not shown in FIG. 1.

In the method of the invention, the 1-hexene adsorption rate depends only on the 1-hexene feed rate. Conversely, 1-hexene desorption from either alumina or activated carbon, with ethylene purge at 350 psig occurs at the dew point of the respective monomers. The 1-hexene desorption rate is proportional to the ethylene space velocity (weight hourly space velocity—WHSV), regardless of the adsorbent used. It will be apparent to those skilled in the art that, in the adsorption cycle, the amount of unreacted monomer adsorbed in the adsorption column may be monitored by any convenient means, such as a gas chromatographic column, to assure that less than the saturation amount of the unreacted monomer for a given adsorbent is conducted into the adsorption bed. The saturation amount of the monomer for a given adsorbent is determined by "breakthrough" characteristics for each adsorbent/monomer combination. The breakthrough occurs when the capacity of the adsorbent to adsorb a given monomer is exceeded and the monomer begins to exit with the gas, conducted to flare in the embodiment of FIG. 1, from the exit end of the adsorption bed. The periodic samples of gas to the monitoring means, e.g., a gas chromatograph, would be drawn from this exit stream. The breakthrough point for each adsorbent/monomer combination can be easily determined by those skilled in the art from the technical literature. Similarly, in the desorption cycle, the amount of the monomer removed from the adsorbent is monitored by any convenient means, such as the same gas chromatograph used to detect the monomer in the adsorbent column exit stream, to assure that the desorption cycle is terminated once substantially all of the monomer adsorbed on the adsorbent is removed from the adsorbent, and the regenerated adsorption bed is switched to the adsorption cycle, while the other adsorbent bed is switched to the desorption cycle.

The following Examples further illustrate the essential features of the invention. However, it will be apparent to those skilled in the art that the specific reactants and reaction conditions used in the Examples do not limit the scope of the invention.

EXAMPLE 1

(1-Hexene Adsorption on Alumina)

The method of the invention was demonstrated with a simulated purge vessel vent stream, comprising nitrogen, ethylene and 1-hexene, adsorbed onto about 50 cc of alumina. The adsorption was conducted in a cylindrical column having internal diameter (I.D.) of 1.6 cm and height of 25.9 cm, containing 40 grams (g) or 52 ml of Alcoa H151 alumina, 8/25 mesh. Prior to the adsorption, the alumina was activated by heating for 12 hours at 250° C. with a dry nitrogen purge. The feed stream was heated to 90° C. at atmospheric pressure. The flow rate of the simulated purge vessel vent stream was such that the flow rates of the respective components thereof were as follows:

1-hexene ($C_6^=$) = 10.6 g/hr
ethylene ($C_2^=$) = 2.0 g/hr
nitrogen ($N_2$) = 12.5 g/hr The feed stream was conducted downwardly through the column for 36 minutes (mins), when the adsorption was terminated before breakthrough, so that 6.33 g of 1-hexene was adsorbed onto the alumina in the column.

After the adsorption was completed, the column was subjected to a simulated desorption cycle by passing through it ethylene ($C_2^=$) stream in an upward direction. Ethylene was conducted through the column at 25° C. and 350 psig at the flow rate of 2300 ml/min (calculated at 1 atm pressure) or 158 g/hr. The desorption was completed in 60 minutes, when all of the 1-hexene was desorbed from the alumina.

EXAMPLE 2

(1-Hexene Adsorption Onto Activated Carbon)

The simulated purge vessel vent gas stream of Example 1 was used in this example. This gas stream was passed downwardly through a cylindrical column, 1.6 cm I.D., 24.9 cm high, containing 28 grams or 50 ml of United Catalysts Inc. C8-1-03 activated carbon, 8/25 mesh. The gas stream was passed through the column at 90° C. and 1 atm at the same flow rates as in Example 1. The carbon was activated, prior to the adsorption cycle by heating it for 12 hours at 250° C. with a dry nitrogen purge. The adsorption cycle was conducted for 18 minutes and terminated before breakthrough after 3.67 g of 1-hexene was adsorbed by the carbon.

Subsequently, the column was subjected to a desorption cycle with ethylene at the same conditions as in Example 1. The desorption was terminated after 60 minutes, when all of the 1-hexene was desorbed from the adsorbent.

The complete desorption of 1-hexene in Examples 1 and 2 was determined by gas chromatographic analysis of 1-hexene content in the desorbed stream with a chromatographic column, Model Number 7770 CP Sil 5 CB (available from Chrompack, Inc., Bridgewater, N.J.). The adsorbents' performance in the desorption cycles was plotted by plotting the amount of 1-hexene adsorbed, and subsequently desorbed, as a function of time in the cycle. The results are shown in FIGS. 2 and 3. In the first cycle, illustrated in both Figures, both columns were saturated with 1-hexene, until 1-hexene breakthrough as determined by gas chromatographic analysis of the adsorbent column exit stream. Alumina desorption resulted in a complete 1-hexene recovery. Desorption from activated carbon left residual 1-hexene after each cycle; however no loss in the performance of the adsorbents was observed from cycle to cycle.

The examples illustrate that alumina and activated carbon effectively adsorb higher alpha-olefin monomers, such as 1-hexene, from gaseous streams at low pressure and elevated temperature. The examples also illustrate the ability of ethylene, at relatively high pressure and low temperature, to desorb the higher alpha-olefin monomers, such as 1-hexene, from the adsorbents.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A method of recovering at least one olefin monomer from a vent gas of a vapor phase olefin polymerization process, which comprises passing the vent gas containing at least one olefin monomer into contact with an adsorbent for a sufficient time and substantially at the conditions at which the vent gas is produced in the polymerization process to effect the adsorption of at least one olefin monomer, contacting the adsorbent with a second at least one olefin monomer having lower molecular weight than the first monomer to desorb the first monomer from the adsorbent, thereby producing a second monomer-containing stream comprising the first monomer, the contacting of the adsorbent with the second monomer being carried out substantially at the conditions at which the second monomer is used as a feed in a reactor of the polymerization process, and conducting the second monomer-containing stream into the reactor of the vapor phase polymerization process.

2. A method of claim 1 wherein the first monomer is at least one $C_3$–$C_{10}$ alpha-olefin monomer and the second monomer is at least one $C_2$–$C_{10}$ alpha-olefin monomer.

3. A method of claim 2 wherein the second monomer is ethylene.

4. A method of claim 3 wherein the adsorbent is contacted with the ethylene at a pressure of about 250 to about 400 psig.

5. A method of claim 4 wherein the adsorbent is contacted with the ethylene at the pressure of about 300 to about 375 psig.

6. A method of claim 5 wherein the adsorbent is contacted with the ethylene at the pressure of about 300 to about 350 psig.

7. A method of claim 6 wherein the adsorbent is contacted with the ethylene at ambient temperature.

8. A method of claim 7 wherein the adsorbent is activated carbon, alumina, molecular sieves or silica.

9. A method of claim 8 wherein the adsorbent is activated carbon.

10. A method of claim 9 wherein the $C_3$–$C_{10}$ alpha-olefin monomer is propylene, 1-butene, 1-hexene, 4-methyl-1-pentene, 1-octene, or mixtures thereof.

11. A method of claim 10 wherein the $C_3$–$C_{10}$ alpha-olefin monomer is 1-butene.

12. A method of claim 8 wherein the adsorbent is alumina.

13. A method of claim 12 wherein the $C_3$–$C_{10}$ alpha-olefin monomer is 1-hexene.

14. A method of claim 11 wherein the flow rate of the ethylene is less than or equal to the flow rate of the olefin reactants into the reactor.

15. A method of claim 13 wherein the flow rate of the ethylene is less than or equal to the flow rate of the olefin reactants into the reactor.

16. A method of claim 14 wherein the activated carbon is contacted with the 1-butene at about 90° C. and at atmospheric pressure.

* * * * *

UNITED STATES PATENT AND TRADEMARK OFFICE
CERTIFICATE OF CORRECTION

PATENT NO. : 4,727,122

DATED : February 23, 1988

INVENTOR(S) : Carol S. Lee and John L. Pickering, Jr.

It is certified that error appears in the above-identified patent and that said Letters Patent is hereby corrected as shown below:

Column 2, line 13, "from" should be --for--.

Column 3, line 58, "tothe" should be --to the--.

Column 5, line 13, "removiing" should be --removing--.

Column 7, claim 1, line 49, insert --(first monomer)-- before ", contacting".

Column 7, claim 1, line 50, insert --(second monomer)-- before "having".

Signed and Sealed this

Twenty-seventh Day of December, 1988

Attest:

DONALD J. QUIGG

Attesting Officer

Commissioner of Patents and Trademarks